(12) United States Patent
Liu et al.

(10) Patent No.: US 11,704,110 B2
(45) Date of Patent: *Jul. 18, 2023

(54) METHODS FOR OPTICS MODULE FIRMWARE IN-FIELD UPGRADE

(71) Applicant: Google LLC, Mountain View, CA (US)

(72) Inventors: Jianqiao Liu, Secaucus, NJ (US); Xiangyu Dong, San Jose, CA (US); Pedram Z. Dashti, San Jose, CA (US); Kais Belgaied, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/889,508

(22) Filed: Aug. 17, 2022

(65) Prior Publication Data

US 2022/0398090 A1 Dec. 15, 2022

Related U.S. Application Data

(63) Continuation of application No. 17/201,256, filed on Mar. 15, 2021, now Pat. No. 11,467,822.

(51) Int. Cl.
*G06F 8/65* (2018.01)
(52) U.S. Cl.
CPC ..................................... *G06F 8/65* (2013.01)
(58) Field of Classification Search
USPC ........................................................ 717/168
See application file for complete search history.

(56) References Cited

U.S. PATENT DOCUMENTS

| | | |
|---|---|---|
| 8,869,138 B2 | 10/2014 | Bandakka et al. |
| 10,318,270 B2 | 6/2019 | Tian et al. |
| 2003/0041182 A1 | 2/2003 | Martwick |

(Continued)

FOREIGN PATENT DOCUMENTS

CN    103248424 A    8/2013

OTHER PUBLICATIONS

"Compiler—Interemediate Code Generation"; TutorialsPoint com website [full url in ref.] as captured by the Waybck Machine Internet Archive (archive.org); Jan. 22, 2021 (Year: 2021).

(Continued)

*Primary Examiner* — Qing Chen
*Assistant Examiner* — Clint Thatcher
(74) *Attorney, Agent, or Firm* — Lerner David LLP (57) ABSTRACT

A uniform and unified firmware in-field upgrade capability for the optics modules may ensure compatibility, security and code quality, and scalability. In some examples, an intermediate representation, which includes vendor firmware upgrade operations and control logic, may be defined, received, and parsed. Read/write operations may be communicated to optical module(s) based on the control logic. In some examples, a unified optics module firmware in-field upgrade framework, which has multiple defined software layers, may ensure a uniform and unified approach to managing optics module(s) from different vendors and used by different projects. The software layers that may properly translate optics module read/write operations, abstract and make uniform the read/write operations, provide libraries of intermediate representations, package the intermediate representations into executables/scripts, monitor optics module status, determine when a new firmware is released, and gradually upgrade the optics module firmware.

20 Claims, 6 Drawing Sheets

(56) References Cited

U.S. PATENT DOCUMENTS

| | | |
|---|---|---|
| 2015/0154017 A1 | 6/2015 | Yuan et al. |
| 2016/0162284 A1 | 6/2016 | Meng et al. |
| 2017/0024221 A1 | 1/2017 | He et al. |
| 2017/0344357 A1 | 11/2017 | Su et al. |
| 2020/0301696 A1 | 9/2020 | Yang et al. |

OTHER PUBLICATIONS

Extended European Searc Report for European Patent Applicaton No. 21187297.3 dated Jan. 17, 2022. 8 pages.

METHODS FOR OPTICS MODULE FIRMWARE IN-FIELD UPGRADE

CROSS-REFERENCE TO RELATED APPLICATIONS

The present application is a continuation of U.S. patent application Ser. No. 17/201,256, filed Mar. 15, 2021, the disclosure of which is incorporated herein by reference.

BACKGROUND

Compared to copper transmission, optical links have much higher capacity and may be used for longer high bandwidth communication. An optics transceiver, also known as an optics module, which converts signals from electrical to optical and vice versa, is a component in optical transmissions. Such a module has been widely used in multiple products such as a tensor processing unit (TPU) network and switch fabrics. When transmission and reception rates of data are slow, signal conditioning by the optics module may be minimal and analog re-timers in the optics module may be used in the analog domain to completely recover and regenerate a data signal. As transmission and reception rates of data increase, such as 25 GB baud rates, and complex modulation schemes, such as PAM4, are used, analog re-timers may be used less frequently by the optics module. Instead, Digital Signal Processor (DSP) technology may be highly utilized by the optics modules attached to the optical links. DSPs within the optics module may be used to sample and convert the analog signal to digital values and then attempt to recover the signal using complex algorithms with a large number of parameters to tune and optimize. The complex algorithms used for signal recovery may rely heavily on the software, such as firmware, which operates on a dedicated Micro Control Unit (MCU) embedded in the DSPs within the optics module. The complexity of the optics module's DSPs and the software, such as firmware, which operates on the associated MCUs makes each of these components prone to firmware bugs and issues during the development phase of an optics module related project. In order to fix these bugs and issues, the firmware of the optics module may often need to be upgraded. For an organization with projects that use optics modules, such as TPU Superpod deployments, managing the quality of the supplied and deployed optics modules may involve several in-field firmware upgrades to eliminate bugs and issues in the optics modules. Therefore, firmware in-field upgrade capability for the optics modules may be an important factor in managing the supply chain of optics modules.

Vendors in an organization's supply chain of optical modules may develop their own individual tools and protocols for optics module firmware in-field upgrade. However, such an approach may be infeasible for the organization to manage. For example, such an approach may have compatibility concerns due to development of the tools and protocols on different platforms utilizing different operating systems. These vendor developed tools and protocols may not operate properly for the organization's production environment. As another example, the vendor developed tools and protocols may include security and code quality concerns by not meeting the organization's security and quality requirements. These vendor developed tools and protocols may entail massive human effort to validate and maintain. As yet another example, there may be a scalability concern if there are many different vendors of optics modules to the organization. If each vendor develops its own tools and protocols, the organization may have to manage an unwieldy number of tools and protocols and may burden its human resources. Additionally, vendors and different projects making use of optics modules may also manage the optics modules in significantly different ways adding to the organization's burden of managing the modules.

BRIEF SUMMARY

A uniform and unified firmware in-field upgrade capability for the optics modules, as presented herein, may be used to ensure compatibility, security and code quality, and scalability in the optics module upgrade process. In some examples, an intermediate representation, which includes vendor firmware upgrade operations and control logic, may be defined. At the organization, the intermediate representation may be received and parsed, and read/write operations may be communicated to optical module(s) based on the control logic. Such an intermediate representation may be used to set up the optics module in upgrade mode, load new software/firmware code to the module, verify the integrity of the code, bring the module back to mission mode, and reset the module among other tasks.

In some examples, a unified optics module firmware in-field upgrade framework, which has multiple defined software layers, may also be defined to ensure a uniform and unified approach to managing optics modules that are from different vendors and that are used by different projects. The framework may have several software layers that may properly translate read/write operations for each optics module used by each of several projects, abstract and make uniform the read/write operations to each optics module, and provide libraries of intermediate representations. The framework may also include layers that package the intermediate representations into executables/scripts, monitor the status of optics modules, determine when a new module firmware is released, and gradually upgrade the firmware on the optics modules. Use of such techniques and the framework may ensure compatibility, security and code quality, and scalability for firmware in-field upgrade of optics modules.

In general, one aspect of the subject matter described in this specification is a process for upgrading firmware within an optics module coupled to a management system. An intermediate representation (IR) based file may be received using a processor. The IR based file may be received from an optics module vendor. The IR based file may include operations and control logic for upgrading the optics module. The IR based file may be parsed, using the processor, to determine the operations. The operations may include read operations and write operations. The operations may be communicated to the optics module using the management system and based on the control logic. The firmware of the optics module may be upgraded based on the communicated operations. The IR based file may be a comma separated value (CSV) file. The operations may include Two Wire Interface (TWI) protocol operations. The IR based file may include multiple sections. The IR based file may include a section that includes a supported optics module base firmware revision, and a section defining delays after the read operations and the write operations. The management system may include a management chip disposed and coupled between the optics module and a processor. The management chip may be used to decode the read operations and the write operations from a first interface and protocol, and to send the decoded read operations and the write operations to an optics module using a second interface and protocol.

Another aspect of the subject matter includes a system for upgrading firmware within an optics module. The system may include a management system and one or more processors that are configured to perform one or more operations. An intermediate representation (IR) based file may be received. The IR based file may be received from an optics module vendor. The IR based file may include operations and control logic for upgrading the optics module. The IR based file may be parsed to determine the operations. The operations may include read operations and write operations. The operations may be communicated to the optics module using the management system and based on the control logic. The firmware of the optics module may be upgraded based on the communicated operations. The IR based file may be a comma separated value (CSV) file. The operations may include TWI protocol operations. The IR based file may include multiple sections. The IR based file may include a section that includes a supported optics module base firmware revision, and a section defining delays after the read operations and the write operations. The management system may include a management chip disposed and coupled between the optics module and a processor. The management chip may be used to decode the read operations and the write operations from a first interface and protocol, and to send the decoded read operations and the write operations to optics module using a second interface and protocol.

Yet another aspect of the subject matter includes a non-transitory computer-readable medium storing instructions, that when executed by one or more processors, cause the one or more processors to perform various operations. An intermediate representation (IR) based file may be received. The IR based file may be received from an optics module vendor. The IR based file may include operations and control logic for upgrading the optics module. The IR based file may be parsed to determine the operations. The operations may include read operations and write operations. The operations may be communicated to the optics module using the management system and based on the control logic. The firmware of the optics module may be upgraded based on the communicated operations. The IR based file may be a comma separated value (CSV) file. The operations may include TWI protocol operations. The IR based file may include multiple sections. The IR based file may include a section that includes a supported optics module base firmware revision, and a section defining delays after the read operations and the write operations. The management system may include a management chip disposed and coupled between the optics module and a processor.

DETAILED DESCRIPTION

The present disclosure provides a uniform and unified firmware in-field upgrade capability for optics modules. The upgrade capability may be used by an organization in a process of upgrading their optics modules. For example, the upgrade capability may ensure compatibility, security and code quality, and scalability in the optics module upgrade process.

An intermediate representation may be defined, wherein the intermediate representation includes vendor firmware upgrade operations and control logic for the upgrade process. For example, the intermediate representation may be a file or other data structure that includes operations, such as read/write operations. The intermediate representation may be used by each vendor to provide optics module upgrade instructions, in lieu of each vendor developing their own tool or protocol for such upgrades. Such an intermediate representation may be used to set up the optics module in upgrade mode, load new software/firmware code to the module, verify the integrity of the code, bring the module back to mission mode, and reset the module among other tasks. At the organization, the intermediate representation may be received, parsed, and communicated to optical module(s) based on the control logic. The firmware or other software associated with the optics module(s) at the organization may be upgraded based on the communicated operations.

The present disclosure further provides a framework for the upgrade capability. The framework includes multiple defined software layers. For example, the framework may have a bottom layer that may properly translate read/write operations for each optics module vendor and project. The framework may have a unified interface layer that makes the read/write operations to the optics module(s) uniform for all vendors/projects. The framework may have a middle layer that may include libraries of intermediate representations, such as a CSV file format or a Common Management Interface Specification Rev. 4.0 (CMIS-4.0) format. These libraries may have the operations and control logic for optics module upgrades. The operations may be marshalled and formatted in a particular manner. The framework may also have system integration and system management service layers. These layers may include executables/scripts that package the intermediate representations. These layers may monitor the status of optics modules, determine when a new module firmware is released, and gradually upgrade the firmware on the modules. Use of such techniques and the framework may have several advantages, such as compatibility, security, code quality, and scalability, as discussed herein. Such a framework may be defined to ensure a uniform and unified approach to managing optics modules that are from different vendors and that are used by different projects.

Figure 1:
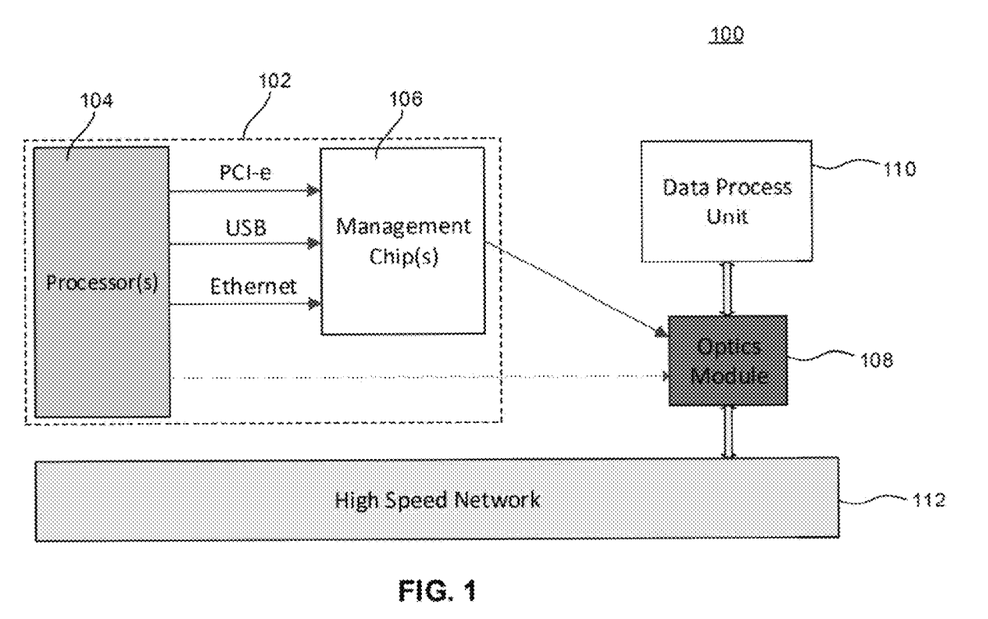
FIG. 1 is a block diagram illustrating a hardware architecture for communicating with optics module(s) in accordance with aspects of the disclosure.

FIG. 1 is a block diagram illustrating a hardware architecture 100 for communicating with optics module(s). The hardware architecture 100 includes a management system 102, an optics module 108, a data processing unit 110, and a high speed network 112.

The management system 102 may include processor(s) 104, such as a Central Processing Unit (CPU), and management chip(s) 106. The management system 102, in this example, may be an electronic device that is operably coupled with the optics module 108. The management system 102 may communicate various types of operations, commands, and/or requests to the optics module 108. The management system 102 may take a number of forms. As some examples, the management system 102 may be implemented as a stand-alone computing device, an add-on computing device, a personal computer, a laptop computer, a server, a tablet computer or a netbook computer. In other implementations, the management system 102 may take other forms as well.

The processor(s) 104 may include one or more general purpose processors and/or one or more special purpose processors, such as application specific integrated circuits (ASICs), etc. The processor(s) 104 may be of any type including but not limited to one or more microprocessor (uP), one or more microcontroller (uC), one or more digital signal processor (DSP), or any combination thereof. The processor(s) may each include one more level of caching, a processor core, and registers. Each processor core may include an arithmetic logic unit (ALU), a floating point unit (FPU), a digital signal processing core (DSP Core), or any combination thereof. The processor(s) 104 may be configured to execute computer-readable program instructions that may be contained in a data storage and/or other instructions as described herein.

In some examples, the processor(s) 104 may communicate directly with the optics module 108 using a communication interface and protocol. For example, the processor(s) 104 may communicate with the optics module 108 using an TWI interface and protocol. As another example, the processor(s) 104 may communicate with the optics module 108 using one or more of a CAN interface and protocol, a SPI interface and protocol, a USB interface and protocol, an eSPI interface and protocol, an Ethernet interface and protocol, a PCI/PCI-e interface and protocol, or any other such interface and protocol. In some examples, processor(s) 104 may communicate with management chip(s) 106 using one or more interface and protocol, such as an TWI interface and protocol, a CAN interface and protocol, a SPI interface and protocol, a USB interface and protocol, an eSPI interface and protocol, an Ethernet interface and protocol, a PCI/PCI-e interface and protocol, or any other interface and protocol. In some examples, the interface and protocol used by the processor(s) 104 to communicate with the management chip(s) 106 may be faster than or the same speed as the interface and protocol used by the processor(s) 104 to communicate with the optics module 108.

In some examples, the management chip(s) 106 may include one or more integrated circuitry components including optical and/or optoelectronic circuitry and components, one or more general purpose processors, and/or one or more special purpose processors, such as ASICs, etc. In some examples, the management chip(s) 106 may communicate with optics module 108 using one or more interface and protocol, such as an TWI interface and protocol, a CAN interface and protocol, a SPI interface and protocol, a USB interface and protocol, an eSPI interface and protocol, an Ethernet interface and protocol, a PCI/PCI-e interface and protocol, or any other interface and protocol. In some examples, the management chip(s) 106 may communicate with the processor(s) 104 using a communication interface and protocol such as what is described above with respect to the communication of the processor(s) 104 with the management chip(s) 106.

The optics module 108 may be any optical transceiver module. The optics module 108 may include one or more DSPs, MCUs, Read Only Memory (ROM), photonic integrated circuits, optical and/or optoelectronic circuitry and related components, printed circuit boards, transimpedance amplifiers (TIAs), modulators, modulator drivers, electrical contacts, control circuits, processors, or the like. In some implementations, the optics module 108 may be a modular component of a larger optical device such as an optical switch, gateway, or reconfigurable optical add/drop multiplexer. In some examples, the optics module 108 may be used as a transceiver in an organization's switch fabric and/or used in chip-to-chip communication in machine learning accelerator projects. The optics module 108 may transmit and/or receive analog/optical signals, and the optics module may convert the analog/optical signals to and/or from electrical/digital signals. The optics module 108 may transmit and/or receive electrical/digital signals, and the optics module may convert the electrical/digital signals to and/or from analog/optical signals. The optics module 108 may communicate with the data processing unit 110 and/or the high speed network 112. In particular, the optics module 108 may convert analog/optical signals from the high speed network 112 to digital signals and electrical signals that may be recognizable to the high performance data process unit 110. The optics module 108 may additionally translate the outfeed digital data signals from the data processing unit 110 to analog/optical signals, which may be transmitted on the high speed network 112. These analog/optical signals produced by the optics module 108 may be suitable for long range transmission. The optics module 108 may transmit and/or receive signals at a high speed, such as 10 Gbps to 100 Gbps, but may be capable of transmitting and/or receiving signals at any other speed. The optics module 108 may also communicate with processor(s) 104 and/or management chip(s) 106 in a similar manner as described above in relation to how these components communicate with optics module 108.

In some examples, the management system 102 may monitor the stats and/or performance of the optics module 108. In some examples, the management system 102 may conduct in-field software and/or firmware upgrades on the optics module 108 at different times, such as when new software and/or firmware is available and/or when the optics module 108 is available for upgrade. The management system 102 may communicate with the optics module 108 directly via the processor(s) 104 and/or directly via the management chip(s) 106, as discussed above. In some examples, the management system 102 may delegate communication with optics module 108 to management chip(s) 106, which may also communicate with the processor(s) 104. In some examples, the interface(s) and protocol(s) used by management system 102 to communicate with optics module 108, such as TWI operating at 100 kbps to the 1 Mbps range, may be slower than the signals received or transmitted by the optics module 108. In some examples, when the management system 102 delegates communication with optics module 108 to management chips(s) 106, the processor(s) 104 may communicate with the management chip(s) 106 via a PCI-e, a USB, and/or an Ethernet interface and protocol.

The data processing unit 110 may be an electronic device that processes streams of data. The data processing unit 110 may include one or more general purpose processors and/or one or more special purpose processors, such as ASICs, etc. The processor(s) included in data processing unit 110 may be of any type including but not limited to one or more microprocessor (uP), one or more microcontroller (uC), one or more digital signal processor (DSP), or any combination thereof. The processor(s) may each include one more level of caching, a processor core, and registers. Each processor core may include an arithmetic logic unit (ALU), a floating point unit (FPU), a digital signal processing core (DSP Core), or any combination thereof. The data processing unit 110 may include one or more programmable networks, communication interfaces, specialized or standard memory, and/or storage. In some examples, data processing unit 110 may send electrical and/or digital signals to optics module 108, using any one or more interfaces and protocols as discussed herein. In some examples, data processing unit 110 may receive electrical and/or digital signals from optics module 108, using any one or more interfaces and protocols as discussed herein.

High speed network 112 may be an optical network that may include any medium of communication that transmits and receives signals encoded in light. These signals may be used to transmit and receive information between devices coupled to the high speed network 112. High speed network 112 may include one or more optical fibers, one or more light source, one or more multiplexer and/or demultiplexer, one or more optical switch, one or more optical splitter, one or more circulator, one or more optical amplifier, and the like. High speed network 112 may receive signals from optics module 108 and/or may transmit signals to optics module 108. Such signals may include analog/optical signals, which may be sent or received at a high speed and over a long range.

Figure 2:
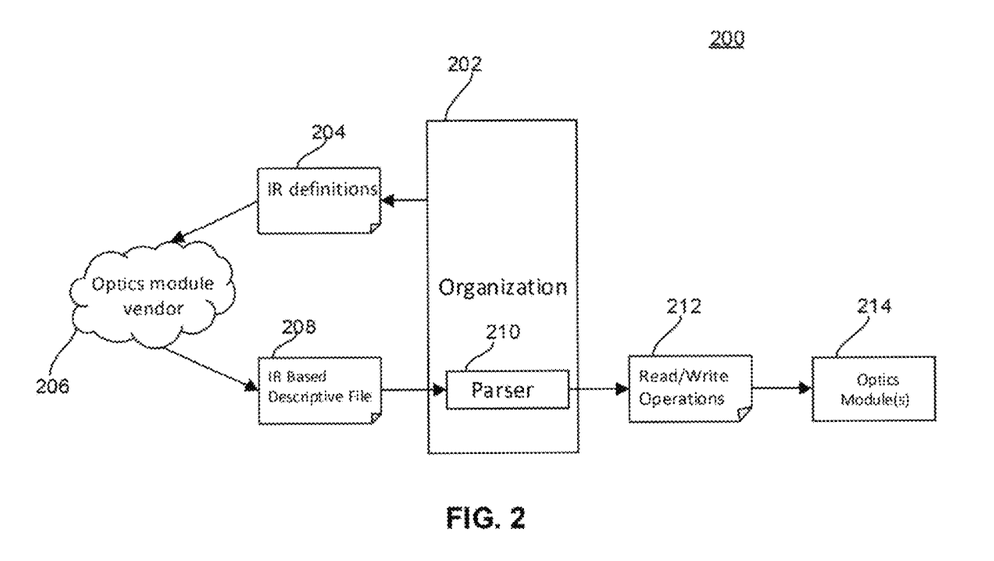
FIG. 2 illustrates a workflow for using an intermediate representation to upgrade optics modules in accordance with aspects of the disclosure.

FIG. 2 illustrates workflow 200 for using an intermediate representation (IR) to upgrade optics modules. Workflow 200 includes an organization 202, intermediate representation (IR) definitions 204, optics module vendor 206, IR based descriptive file 208, parser 210, raw read/write operations 212, and optics module(s) 214. In the workflow 200, organization 202 may provide the IR definitions 204 to one or more vendor, such as optics module vendor 206. The optics module vendor 206 may receive the IR definitions 204 from the organization 202 and may prepare an IR based descriptive file 208 to be sent to the organization 202. Organization 202 may include the parser 210, which may receive as input the IR based descriptive file 208 and may parse the file to translate the file into the raw read/write operations 212, which may be used to upgrade optics module(s) 214.

The organization 202 may be any enterprise which may use one or more optics module for various projects, engineering environments, and/or engineering designs. For example, the organization 202 may be an enterprise, which uses one or more optics module for tensor processing unit (TPU) related projects, datacenter related engineering environments, switching fabric engineering designs, and the like. Such projects, environments, and designs may be internal to the organization 202, or may be used externally by organization 202.

The IR definitions 204 may define a format for the marshalling of operations and control logic associated with upgrading optics modules, such as the optics module(s) 214. In particular, the IR definitions 204 may specify one or more particular file and file type to be used, specify the operations and control logic to be included in the file, specify one or more file format to be used, specify one or more section within the file, specify one or more field within the section(s) and/or file format, specify the syntax of data within the file, specify specific operations to be performed, specify delays while performing the operations, specify comments regarding the information in the file, and the like. The IR definitions 204 may be determined by the organization 202. The IR definitions 204 may be made uniform for each vendor to which the organization 202 provides IR definitions 204. The IR definitions 204 may be provided by organization 202 to one or more vendor, such as optics module vendor 206.

The optics module vendor 206 may be any organization, external to the organization 202, that provides optics modules, such as the optics module(s) 214. In particular, the optics module vendor 206 may be a vendor that provides one or more optics module(s) to the organization 202. The optics module vendor 206 may instead be or may include a third-party organization, which provides software and/or firmware and/or performs maintenance, upkeep, or generally upgrades optics modules. The optics module vendor 206 may receive the IR definitions 204 from the organization 202 and may prepare an IR based descriptive file 208 to be sent to the organization 202.

The IR based descriptive file 208 may be a file which follows the characteristics specified in the IR definitions 204. In particular, the IR based descriptive file 208 may include operations and control logic to perform software and/or firmware in-field upgrade of optics modules, such as optics module(s) 214. For example, the IR based descriptive file 208 may be in a CSV format, and may include multiple sections. These sections may define the supported module part numbers and may define software/firmware versions or revisions that may be upgraded using the IR based descriptive file 208. The IR based descriptive file 208 may include the desired sequence in which the operations within the file are to be performed. The IR based descriptive file 208 may supplant a vendor's software or firmware image to be loaded by the vendor's tool. The IR based descriptive file 208 may include low level operations, for example using TWI. These operations may include read and/or write operations that may set up the optics module(s) 214 in software/firmware upgrade mode, load the new code for the upgrade to the module(s) 214, verify the integrity of the code, bring the module(s) 214 back to mission mode, and/or reset the module(s) 214, among other operations. These operations may allow for a successful software/firmware upgrade of the optics module(s) 214.

Within the organization 202, a computing device, such as the computing device 600 described in connection with FIG. 6, may include and may execute a parser 210. Although shown as being internal to the organization 202, the parser 210 and/or the computing device hosting the parser 210 may be located external to the organization 202. The parser 210 may receive as input the IR based descriptive file 208 and may parse the file to translate the file into the raw read/write operations 212, which may be used to upgrade optics module(s) 214. For example, parser 210 may parse the IR based descriptive file 208 into raw TWI read and write operations. Parser 210 may also parse any control logic, such as delays, and the associated operations from the IR based descriptive file 208. An output of the parser 210 may be raw read/write operations 212. The parser 210 may also output other information, such as instructions for the control logic within the IR based descriptive file 208. This other information may or may not be in raw form, which may be in a form that may be capable of being used and/or processed by the optics module(s) 214. In some examples, the organization 202 may not be able to decipher the meaning of the raw read/write operations or other information that is output from parser 210. For example, the raw read/write operations or other information may not be decipherable if these operations or other information is proprietary to the optics module vendor 206.

An output of parser 210 may result in the raw read/write operations 212, which may be in a form to be used/consumed by the optics module(s) 214 during upgrade. For example, the raw read/write operations 212 may include TWI protocol instructions that may be communicated with optics module(s) 214.

The optics module(s) 214 may each be similar in form and function to the optics module 108 described in connection with FIG. 1. The raw read/write operations 212 may be communicated with the optics module(s) 214 directly, or may be communicated with the optic(s) module(s) 214 by a management system, such as the management system 102, described in connection with FIG. 1. In some examples, control logic from the IR based descriptive file 208 and/or from the output of the parser 210 may be used by a management system, such as the management system 102 of FIG. 1 to perform the upgrade of the module(s) 214. The use of the IR definitions 204 and the IR based descriptive file 208 in this manner may reduce or eliminate the integration of optics module vendor specific tools into the environment of the organization 202, and may provide a unified solution for optics module vendors.

Devices/modules that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for a long period of time (e.g. weeks at a time). In addition, devices that are in communication with each other may communicate directly or indirectly through one or more intermediaries.

In some examples, the IR based descriptive file 208 may be a CSV format file, or CSV file, which may include multiple sections. In some examples, the IR based descriptive file 208, such as a CSV format file, may be prepared automatically using a computing device. In some examples, the IR based descriptive file 208, such as a CSV format file, may be prepared manually. The CSV file may be prepared, for example, by an optics module vendor or by the organization 202. In some examples, the CSV file may include three sections, such as what is shown in Table 1. For example, the first section may define the supported optics module part numbers, the supported base software or firmware revision and/or the new software or firmware revision of the particular CSV format file. The first section may be placed at the beginning of the CSV file. The CSV file may be loaded to a supported optics module with a supported base firmware revision, as specified by the CSV file.

Optics module vendors may supply multiple optics modules to an organization. In addition, an optics module vendor may supply multiple types of optics modules. Vendors may assign each type of optics module a unique part number, which may be a global identifier. This global identifier may be a unique identifier among all optics modules provided by all vendors. Each of the optics modules may be operating using a particular set of base software and/or firmware revisions. The CSV format file may specify the part numbers of the optics module(s) for which the file may be used to upgrade the optics module(s). Additionally, this file may specify the applicable base software or firmware revision(s) of any optics module for which the file may be used to upgrade the optics module. Such part number information and/or revision(s) information may be placed in the first section of the CSV format file.

As another example, a second section of the CSV file may define a delay to be used after each read/write operation, such as the delay to be waited before or after each TWI read/write operation is performed. A device, such as the management system 102 described in connection with FIG. 1, that communicates with the optics module(s), may operate at a higher speed than the hardware within the optics module(s). The delays in this second section of the CSV file may operate as control logic, which may be used to delay communications from a device such as management system 102 to the optics module(s), and which may prevent the optics module(s) from being overwhelmed by receiving too high a number of operations within a period of time.

As yet another example, a third section of the CSV file may define operations, such as read/write operations, used in an optics module software or firmware upgrade process. In the third section, vendors may insert comments in the CSV file for debuggability. Vendors may insert additional delays to handle the resetting of optics module(s). Fixed sized and variable sized read/write operations may be supported. For example, fixed sized and variable sized TWI read/write operations may be supported within the CSV file.

TABLE 1

Example CSV File Format

Section 1:
Module part numbers supported by this script
mpn,<string1>,<string2>, ...
Base module revision
base_rev, <string1>,<string2>, ...
Updated module revision
new_rev, <string>
Section 2:
Operation delays
delay_after_write,<t1> (t1 is floating number in seconds)
delay after_read,<t2> (t2 is floating number in seconds)
read_time_out,<t3> (t3 is floating number in seconds)
Section 3:
Code comment
comment,<string>
Wait for N seconds (N is a floating number)
pause,<seconds>
TWI write
write8,<control_word>,<addr>,<1 byte>
write16,<control_word>,<addr>,<2 bytes>
write32,<control_word>,<addr>,<4 bytes>
write64,<control_word>,<addr>,<8 bytes>
writeblock,<control_word>,<addr>,<data>
TWI read and verify (this means repeated reading until success or time out)
read8,<control_word>,<addr>,<expected 1 byte>
read16,<control_word>,<addr>,<expected 2 bytes>
read32,<control_word>,<addr>,<expected 4 bytes>
read64,<control_word>,<addr>,<expected 8 bytes>
readblock,<control_word>,<addr>,<expected data>
TWI read_only (data_format can be ASCII, INT, etc.)
read_only,<control_word>,<addr>,<data_format>,<length>

In addition to having multiple sections, the syntax and formatting of information within the CSV file may be defined, for example, using the IR definitions 204 described in connection with FIG. 2. For example, the CSV file may specify that the information associated with <control_word>, <addr>, <length>, <1/2/4/8 bytes> and <data> should use hexadecimal and start with "0x". As another example, the CSV file may specify that, for read/write operations, the read/write control_word may be 7-bits. As yet another example, the CSV file may specify that information associated with <data> and <expected data> for writeblock and readblock may formatted as <# of bytes><byte 0><byte 1>. In particular, if readblock returns 5 bytes data of 0x0A 0x0B, 0x0C, 0x00D, 0x0E, information associated with <expected data> may be 0x050A0B0C0D0E. As yet another example, the CSV file may specify that there may be upper/lower bounds for the delays delay_after_write/delay_after_read/read_time_out. These bounds may be provided separately by optics module vendors. As yet another example, the CSV file may specify that in case of revision dependency, the entire upgrade process from any revision to another may be able to complete within a pre-specified amount of time, such as 15 minutes. In particular, if the only upgrade path from revision A to revision E is through A→B→C→D→E, and it takes an amount of time greater than the pre-specified amount of time, particular actions may be taken. For example, in this scenario, the execution time of each step may be shortened, or an additional sequence to compress the path (A→E directly) may be created.

It may be desirable that the optics module software/firmware upgrade procedure, as described in connection with FIGS. 1 and 2, results in an optics module that includes a consistent and recoverable state. This may be true no matter the outcome of the upgrade procedure. Therefore, a recovery mechanism may be defined to handle potential failures during the upgrade procedure. For a typical upgrade of firmware on an optics module, which may include a DSP, an MCU, and a ROM, a set of images for an optics module may be used. For example, the set of images may include a DSP firmware image, an optical module MCU image, and a ROM image, such as an EEPROM image, which may include module identifier information, among other such information. Additional or fewer images may be included in the set of images. Module revision information may be part of the ROM image, such as an EEPROM image. This image may be selectively updated/upgraded, and may be updated if any optics module MCU or DSP firmware change is made during an upgrade procedure. Either or both of the MCU and DSP changes may be optional and the order of the changes may not be fixed. The module revision information that may be a part of the ROM image may only be refreshed after any optics module MCU or DSP firmware change is successfully made.

If a failure occurs during a firmware upgrade of the DSP, the optics module identifier information, such as vendor name, part number, and vendor revision, may still be readable. Additionally, the vendor revision may still be the old value. Therefore, if such a failure occurs, re-running the firmware upgrade process for the DSP may solve the issue.

A MCU firmware upgrade may make the MCU enter a bootloader mode. In the bootloader mode, the optics module multi-source agreement (MSA) information may not be readable. If a MCU firmware upgrade failure occurs, internal tools, such as those within an organization, may not be able to recognize the optics module for which the failure occurred. If such an upgrade failure occurs, it may not be possible to perform any actions including another firmware upgrade for the MCU. In some cases, particular vendors of the optics modules may have the optics module MCU change its communications protocol, such as TWI, bus address in bootloader mode. This may make firmware upgrade failures for the MCU challenging to address. However, a recovery mode may be added to bypass any MSA reading and/or verification portions of the upgrade process.

Figure 3:
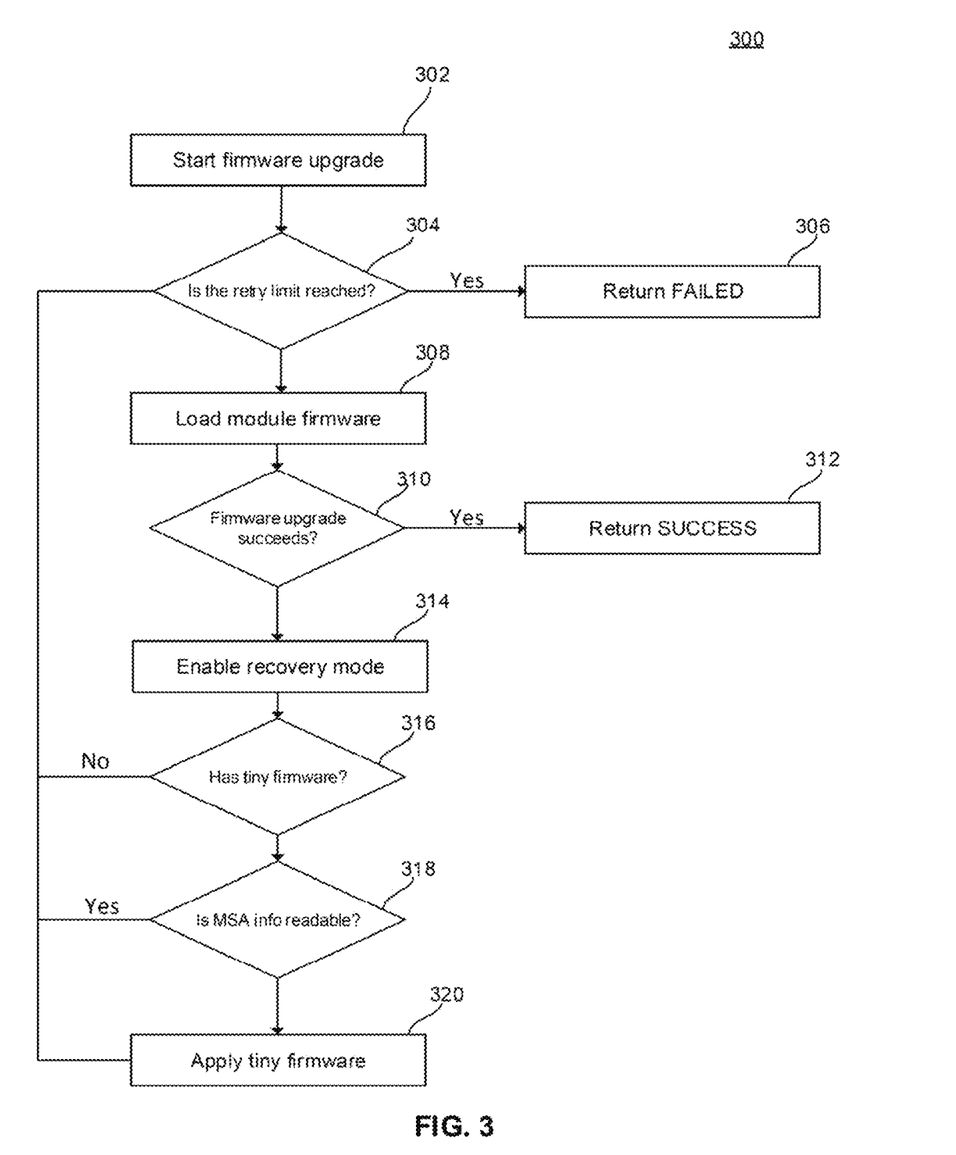
FIG. 3 is a flow diagram of an example process for upgrade failure recovery in accordance with aspects of the disclosure.

FIG. 3 is a flow diagram of an example process 300 for upgrade failure recovery. All or a portion of the blocks of process 300 may be performed by any computing device described herein. While the blocks are illustrated and described in a particular order, it should be understood that the order may be modified and operations may be added or omitted.

Optics module vendors, such as those that have the MCU change its communication protocol bus address in bootloader mode, may provide a tiny firmware to the organization performing the optics module upgrade. For example, the tiny firmware may allow for the protocol bus address to be reverted back to the normal communication protocol, such as TWI, bus address after any optics module MCU upgrade failure. The tiny firmware may be a firmware that is smaller in size than regular firmware, and may include default code and information. As a result, the tiny firmware may be a default firmware. This firmware may allow for the basic functioning of an optics module MCU and other optics module components. This tiny firmware may also be used for recovery of the optics module or a subsequent upgrade attempt after a firmware upgrade failure. Some optics module vendors may not provide a tiny firmware. This may occur when the communication protocol, such as TWI, bus address may not change even after any upgrade failure.

In block 302, the firmware upgrade process may be initiated. In particular, communications with an optics module may be initiated for an optics module firmware upgrade to occur. Such communications may occur via communications between another device and the optics module, such as what is described in connection with FIGS. 1 and 2. The communications may include low level read and/or write operations, for example using TWI. The operations communicated to the optics module may set up the optics module and/or any of its components, such as a DSP and/or an MCU, in an upgrade mode or in a bootloader mode.

In block 304, it may be determined if a retry limit has been reached. For example, the retry limit may be a threshold that is compared to a numerical count of the number of optics module firmware, DSP firmware, and/or MCU firmware upgrade attempts that have been made. The numerical count may be a positive integer value. The retry limit may be a threshold number of firmware upgrade attempts. The threshold number of upgrade attempts may be set by a vendor, an organization, manually, automatically, while the optics module or its components are not functioning, and/or while the optics module or its components are functioning. The threshold number of upgrade attempts may be set for each optics module or its components based on any characteristics associated with the optics module or its components or the particular use of the optics module and/or its components. If the numerical count exceeds the threshold number of upgrade attempts, it may be determined that a retry limit has been reached, and then process 300 may proceed to block 306. If the numerical count does not exceed the threshold number of upgrade attempts, it may be determined that a retry limit has not been reached, and the process 300 may proceed to block 308.

In block 306, it may be determined that the firmware upgrade for the optics module and/or its components has failed. A failure code, a failure message, an indication, and/or data associated with the failure may be returned by process 300, and process 300 may terminate. The information returned by process 300 may be stored on a storage and/or displayed on a display.

In block 308, an attempt at upgrading the firmware for an optics module and/or one of its components may be made. For example, low level read and write operations may be used to load new code to the optics module for upgrading the firmware of the optics module and/or its components. The read and write operations may be communicated to the optics module based on, for example, an IR based descriptive file used to communicate read/write operations to the optics module, as described in connection with FIGS. 1 and 2.

In block 310 it may be determined whether the optics module firmware upgrade attempt made in block 308 was successful. For example, if the firmware upgrade attempt was successful, the optics module and its components may be fully operational. As another example, if the firmware upgrade attempt was successful the firmware revision of the optics module and/or its components may indicate a more recent or the most recent firmware being used. For example, if the firmware upgrade attempt was unsuccessful, the optics module and/or its components may not be fully operational. As another example, if the firmware upgrade attempt was unsuccessful the firmware revision of the optics module and/or its components may indicate a default firmware, the same firmware prior to upgrade, or a previous firmware being used. If the firmware upgrade was successful, then process 300 may proceed to block 312. If the firmware upgrade was unsuccessful, then process 300 may proceed to block 314.

In block 312, it may be determined that the firmware upgrade for the optics module and/or its components was successful. A success code, a success message, an indication, and/or data associated with the successful upgrade may be returned by process 300, and process 300 may terminate. The information returned by process 300 may be stored on a storage and/or displayed on a display.

In block 314, it may be determined that the firmware upgrade for the optics module and/or its components was unsuccessful and a recovery mode and/or a bootloader mode may be enabled on the optics module. In particular, communications with an optics module may be initiated to place the optics module and/or its components in a recovery or a bootloader mode. Such communications may occur via communications between another device and the optics module, such as what is described in connection with FIGS. 1 and 2. The communications may include low level read and/or write operations, for example using TWI. The operations communicated to the optics module may set up the optics module and/or any of its components, such as a DSP and/or an MCU, in a recovery or a bootloader mode.

In block 316, it may be determined whether tiny firmware, associated with the optics module which failed to be upgraded, has been received or is included with the optics module. Optics module vendors, such as those that have a change in their communication protocol bus address in bootloader mode, may provide tiny firmware to the organization performing the optics module upgrade. The tiny firmware may be in the form of an IR based descriptive file. For example, the tiny firmware may allow for the protocol bus address to be reverted back to the normal communication protocol, such as TWI, bus address after any optics module upgrade failure. As another example, the tiny firmware may be a default firmware that may allow for the basic functioning of the optics module and/or its components to allow for recovery of the optics module or a subsequent upgrade attempt after a firmware upgrade failure. In some examples, it may be determined whether a tiny firmware exists based on a search of any repository, storage, memory, or device accessible to the organization attempting to upgrade the optics module. In some examples, the tiny firmware may be included and located within a storage, a memory, or component of the optics module. If a tiny firmware for the optics module is found, process 300 may proceed to block 318. If a tiny firmware for the optics module is not found, process 300 may proceed to block 304.

In block 318, it may be determined whether optics module multi-source agreement (MSA) information is readable. For example, it may be determined that the optics module MSA information may be readable based on attempted communications with the optics module successfully receiving MSA information and/or an indication related to the MSA information in a return communication. For example, it may be determined that the optics module MSA information may not be readable based on attempted communications with the optics module not receiving a return communication from the optics module. If the optics module MSA information is readable, then process 300 may proceed to block 304. If the optics module MSA information is not readable, the process 300 may proceed to block 320.

In block 320, the tiny firmware, such as that found in block 316, and associated with the optics module may be applied to the optics module. For example, in order to apply the tiny firmware, low level read and write operations may be used to load new code associated with the tiny firmware to the optics module and/or its components. The read and write operations may be communicated to the optics module based on, for example, a tiny firmware IR based descriptive file used to communicate read/write operations to the optics module, as described in connection with FIGS. 1 and 2. Once the tiny firmware has been applied to the optics module, process 300 may proceed to block 304.

Process 300 may allow for returning an optics module to a manageable status when a firmware upgrade failure is experienced. However, in some cases when optics module rack power is lost or when an upgrade retry limit, such as in block 304, is reached, human intervention may be able to recover the optics module. In these cases, the optics modules may be considered to be "blank" and not usable for its intended purpose. In those cases, a vendor specific Return Materials/Merchandise Authorization (RMA) process may be used to fix, update, or change the optics module. In these cases, a new optics module may have to be used.

Figure 4:
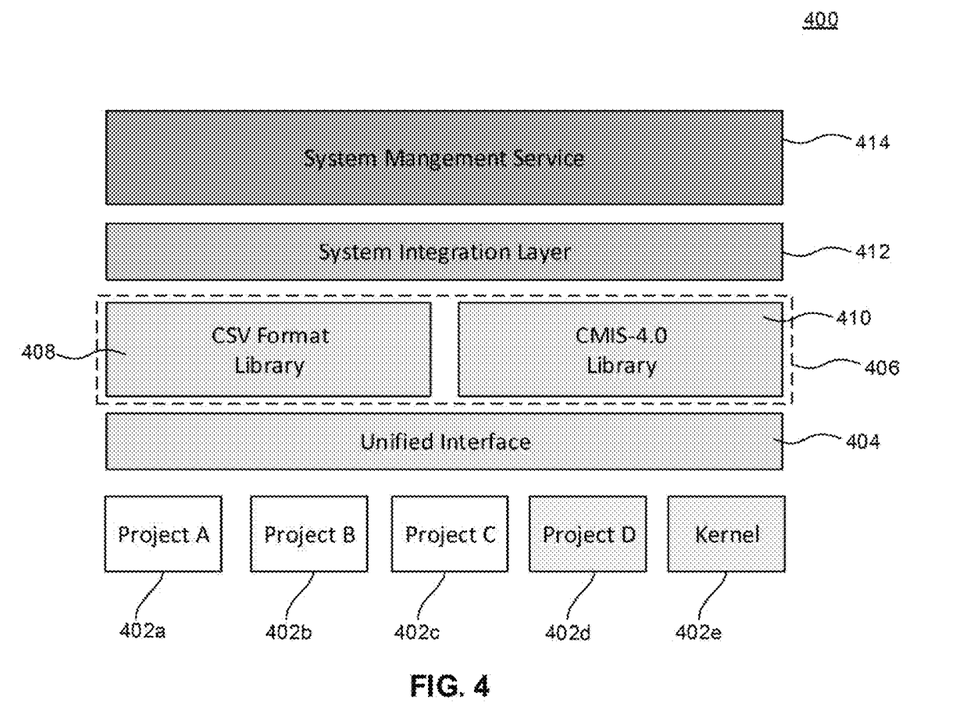
FIG. 4 is a block diagram illustrating a unified optics module firmware upgrade framework in accordance with aspects of the disclosure.

FIG. 4 is a block diagram illustrating unified optics module firmware upgrade framework 400. The unified optics module firmware upgrade framework 400 may include several layers, such as projects layer 402, including projects 402a-e, unified interface layer 404, IR libraries layer 404, including CSV format library 406, and CMIS-4.0 library 408, system integration layer 410, and system management service layer 412. Although not pictured in FIG. 4, unified optics module firmware upgrade framework 400 may include additional layers. Unified optics module firmware upgrade framework 400 may also include fewer layers than those pictured in FIG. 4.

The projects layer 402 may include project specific implementations (402a-402e) of optics modules, which use a particular communication interface and protocol, such as TWI. In some examples, a processor, such as the processor(s) 104 described in connection with FIG. 1, communicates with an optics module, such as the optics module 108 described in connection with FIG. 1, using a management chip, such as the management chip(s) 106 described in connection with FIG. 1. The communication between the management chip and the optics module may use a first interface and protocol, such as TWI, while the communication between the processor and the management chip may use a second interface and protocol, such as PCIe. In these scenarios, the projects layer 402 may translate between operations, such as read/write operations, that use the first interface and protocol, such as TWI, and commands that use the second interface and protocol, such as PCIe. Translation of operations/commands in this manner may allow a management chip to decode a read/write command/operation that uses the second interface and protocol, as translated/decoded by projects layer 402, and to send decoded read/ write operations/commands to the optics module using the first interface and protocol, such as TWI. The projects layer 402 may also include a standard Linux kernel interface and protocol implementation, such as TWI.

The unified interface layer 404 may include an abstraction of operations to the optics module. The unified interface layer 404 may isolate the variance between the hardware used in various projects, such as the projects 402a-e, while also allowing for a high amount of portability. The unified interface layer 404 may allow for the same or similar interface and protocol, such as TWI, to be used by each project. In particular, each project may use the unified interface layer 404 to access commands/operations that use a particular interface and protocol, such as TWI. In some examples, the unified interface layer 404 may be used to translate/decoder operations and/or commands. For example, the unified interface layer 404 may be used when an optics module may be connected to and communicating with an evaluation board, and the evaluation board may be connected to and communicating with a computing device using an interface and protocol, such as Ethernet. In the example part of an TWI interface, an interface object may include a function that executes a blocking TWI read operation. In particular, the function may perform an TWI start, write the address to the bus, and then perform read operations of size size_bytes, followed by an TWI stop condition. For example, this function may include the syntax: virtual absl::Status Read(uint8 address, void*buffer, size_t size_bytes)=0. The interface object may also include a function that executes a blocking TWI write operation. In particular, the function may perform an TWI start, write the address to the bus, and then perform write operations of size size_bytes, followed by an TWI stop condition. For example, this function may include the syntax: virtual absl::Status Write(uint8 address, const void*buffer, size_t size_bytes)=0. The interface object may further include a function that sets a optics module control word. For example, this function may include the syntax: virtual absl::Status SetDeviceControlWord(uint8 control_word)=0. The interface object may further include a function that sets the TWI bus address on which the optics module operates. For example, this function may include the syntax: virtual absl::Status SetBus(int bus)=0.

The IR libraries layer 406 may include several libraries of IR based descriptive files. The IR based descriptive files may be provided by different optics module vendors. The IR based descriptive files may be in various formats, such as a CSV format or a CMIS-4.0 format. In some examples, the IR libraries layer 406 may include the CSV format library 408 and/or the CMIS-4.0 library 410. The CSV format library 408 may store various CSV format files, as described herein, for use in communications with optics module(s). Each CSV format file may be used during a software or firmware upgrade of an optics module. Use of such CSV format files may regulate the module in-field firmware upgrade process.

The CMIS-4.0 library 410 may store various CMIS-4.0 format files for use in communications with optics module(s). The CMIS-4.0 may be defined by the optics industry, and may be used by particular optics module vendors. The CMIS-4.0 may use a Command Data Block (CDB) based optics module firmware upgrade workflow. The workflow may include several download commands and may also include a fault-tolerant state machine. Each CMIS-4.0 format file may be used during a firmware upgrade of an optics module. Use of such CMIS-4.0 format files may assist in standardizing the module in-field firmware upgrade process. Both the CSV format library 408 and the CMIS-4.0 library 410 may co-exist and be implemented in the unified optics firmware in-field upgrade framework.

The system integration layer 410, and the system management service layer 412 may package the libraries in the IR libraries layer 406, such as the CSV format library 408 and the CMIS-4.0 library 410, into executables and/or scripts. These executables and/or scripts may be integrated into the system management service layer 412. The system management service layer 412 may provide functionality to monitor optics modules' status. In some examples, the system management service layer 412 may provide functionality to monitor the status across all projects, datacenters, and deployments across an organization. In some examples, when a new optics module software or firmware is released, for example by a vendor or a third-party, the system management service layer 412 may provide functionality to gradually implement the new software or firmware on the optics module(s) that are used for various purposes within an organization. In particular, the system management service layer 412 may provide functionality to drain the network traffic within computing systems connected to the optics module(s), to load the new software or firmware to the optics module(s), and then to recover the state of the computing systems connected to the optics module(s).

Figure 5:
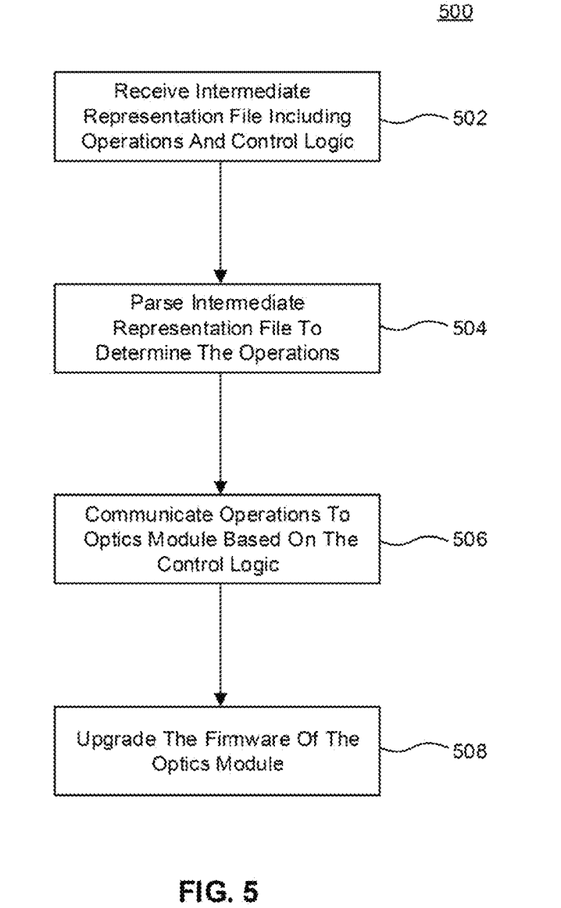
FIG. 5 is a flow diagram of an example process for upgrading an optics module using an intermediate representation (IR) in accordance with aspects of the disclosure.

FIG. 5 is a flow diagram of example process 500 for upgrading an optics module using an intermediate representation (IR) in accordance with aspects of the disclosure. The process 500 may include blocks 502, 504, 506, and 508. All or a portion of the blocks of the process 500 may be performed by any computing device described herein. In some examples, the process 500 may be performed using the hardware architecture 100 described in connection with FIG. 1 and/or by the computing device 600 described in connection with FIG. 6.

In block 502, an IR based descriptive file, such as the IR based descriptive file 208 described in connection with FIG. 2, may be received. For example, the IR based descriptive file may be received from an optics module vendor at a computing device, such as the computing device 600 or described in connection with FIG. 6 or the management system 102 described in connection with FIG. 1. The IR based descriptive file may be received at an organization that makes use of optics module(s). The IR based descriptive file may include operations and control logic to perform software and/or firmware in-field upgrade of optics modules, such as the optics module(s) 214 described in connection with FIG. 2 or the optics module 108 described in connection with FIG. 1. For example, the IR based descriptive file may be in a CSV format, and may include multiple sections. These sections may define the supported module part numbers and may define software/firmware versions or revisions that may be upgraded using the IR based descriptive file. The IR based descriptive file may include the desired sequence in which the operations within the file are to be performed. The IR based descriptive file may include low level operations, for example using TWI, that may set up the optics module(s) in software/firmware upgrade mode, that may load the new code for the upgrade to the module(s) using read and write operations, that may verify the integrity of the code, that may bring the module(s) back to mission mode, and that may reset the module(s), among other operations. These operations may allow for a successful software/firmware upgrade of the optics module(s).

In block 504, a computing device, such as the computing device 600 described in connection with FIG. 6 or the management system 102 described in connection with FIG.

1, may include a parser in a memory or storage coupled to the device/system, and may execute the parser. The parser may be similar to the parser 210 described in connection with FIG. 2. The parser and/or the computing device hosting the parser may be located internal or external to the organization to which the IR based descriptive file is sent. The parser may receive as input the IR based descriptive file and may parse the file to translate the file into the raw read/write operations, which may be used to upgrade the optics module(s). For example, the parser may parse the IR based descriptive file into raw TWI read and write operations. The parser may also parse any control logic, such as delays, and the associated operations from the IR based descriptive file. An output of the parser may be raw read/write operations. The parser may also output other information, such as instructions for the control logic within the IR based descriptive file. This other information may or may not be in raw form, which may be in a form that is capable of being used and/or processed by the optics module(s). An output of the parser may result in raw read/write operations, which may be in a form to be used by the optics module(s) during an upgrade.

In block 506, the read/write operations may be communicated with the optics module(s). For example, raw read/write operations may include TWI protocol instructions that may be communicated with the optics module(s). The read/write operations may be communicated with the optics module(s) directly, or may be communicated with the optic(s) module(s) by a management system, such as the management system 102 described in connection with FIG. 1. In some examples, control logic from the IR based descriptive file and/or from the output of the parser may be used by a management system, such as the management system 102 of FIG. 1, to perform the upgrade of the optics module(s). The read/write operations may be communicated with the optics module(s) based on the control logic from the IR based descriptive file. In particular the control logic, such as delays and the like, from the IR based descriptive file may be communicated using the processor(s) and/or the management chips in the management system. In the process of communicating with the optics module(s), the management system and/or the management chip within the management system may decode the read/write operations from a first interface and protocol, such as PCIe, and may send the decoded read/write operations to the optics module(s) using a second interface and protocol, such as TWI. The use of the IR based descriptive file in this manner may supplant integration of optics module vendor specific tools into the environment of an organization using optics module(s). It may also provide a unified solution for optics module vendors.

In block 508, the optics module(s) may be upgraded based on the read/write operations and/or the control logic from block 506. In particular, the operations and/or the control logic may be used to set up the optics module(s) in an upgrade mode, to load new software/firmware code to the module(s), to verify the integrity of the code, to bring the module(s) back to mission mode, and to reset the module(s), among other tasks. Such a uniform and unified firmware in-field upgrade capability for the optics modules may be used to ensure compatibility, security and code quality, and scalability in the optics module upgrade process.

Figure 6:
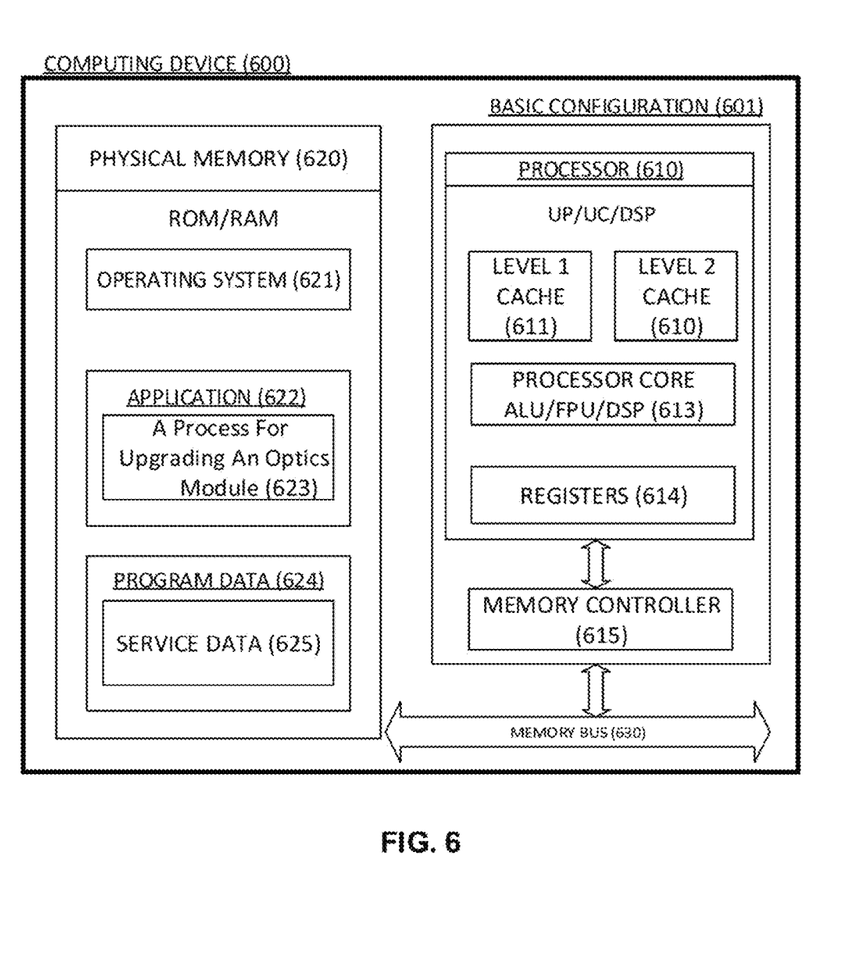
FIG. 6 is a block diagram of an example computing device in accordance with aspects of the disclosure.

FIG. 6 is a block diagram of an example computing device 600. The computing device 600 may include one or more processors 610 and system memory 620. A memory bus 630 may be used for communicating between the processor 610 and the system memory 620.

Depending on the desired configuration, the processor 610 may be of any type including but not limited to a microprocessor (uP), a microcontroller (uC), a digital signal processor DSP), or any combination thereof. The processor 610 may include one more level of caching, such as a level one cache 611 and a level two cache 612, a processor core 613, and registers 614. The processor core 613 may include an arithmetic logic unit (ALU), a floating point unit (FPU), a digital signal processing core (DSP Core), or any combination thereof. A memory controller 615 may also be used with the processor 610, or in some implementations the memory controller 615 can be an internal part of the processor 610.

Depending on the desired configuration, the physical memory 620 may be of any type including but not limited to volatile memory, such as RAM, non-volatile memory, such as ROM, flash memory, etc., or any combination thereof. The physical memory 620 may include an operating system 621, one or more applications 622, and program data 624. The application 622 may include a process of writing data to physical memory. Non-transitory computer-readable medium program data 624 may include storing instructions that, when executed by the one or more processing devices, implement a process for upgrading an optics module 623. In some examples, the application 622 may be arranged to operate with program data 624 on an operating system 621.

The computing device 600 may have additional features or functionality, and additional interfaces to facilitate communications between the basic configuration 601 and any required devices and interfaces.

Physical memory 620 may be an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media can be part of the device 600.

The computing device 600 may be implemented as a portion of a small form factor portable (or mobile) electronic device such as a cell phone, a smartphone, a personal data assistant (PDA), a personal media player device, a tablet computer (tablet), a wireless web-watch device, a personal headset device, an application-specific device, or a hybrid device that include any of the above functions. The computing device 600 may also be implemented as a personal computer including both laptop computer and non-laptop computer configurations. The computing device 600 may also be implemented as a server or a large-scale system.

Aspects of the present disclosure may be implemented as a computer implemented process, a system, or as an article of manufacture such as a memory device or non-transitory computer readable storage medium. The computer readable storage medium may be readable by a computing device and may comprise instructions for causing a computing device or other device to perform processes and techniques described in the present disclosure. The computer readable storage medium may be implemented by a volatile computer memory, non-volatile computer memory, hard drive, solid state memory, flash drive, removable disk, and/or other memory or other non-transitory and/or transitory media. Aspects of the present disclosure may be performed in different forms of software, firmware, and/or hardware. Further, the teachings of the disclosure may be performed by an application specific integrated circuit (ASIC), field programmable gate array (FPGA), or other component, for example.

Aspects of the present disclosure may be performed on a single device or may be performed on multiple devices. For example, program modules including one or more components described herein may be located in different devices and may each perform one or more aspects of the present disclosure. As used in this disclosure, the term "a" or "one" may include one or more items unless specifically stated otherwise. Further, the phrase "based on" is intended to mean "based at least in part on" unless specifically stated otherwise.

Although various blocks, algorithms, or the like, such as those described in connection with FIGS. 3 and 5, may be described or claimed in a particular sequential order, such processes may be configured to work in different orders. In other words, any sequence or order of operations that may be explicitly described or claimed does not necessarily indicate a requirement that the operations be performed in that order. The operations of processes described herein may be performed in any order possible, and operations may be added or omitted.

Although a process, such as the process described in connection with FIG. 3 or FIG. 5, may be described as including a plurality of operations, which does not imply that all or any of the operations are preferred, essential or required. Various other implementations may include other processes that omit some or all of the described operations. Although a process may be described singly or without reference to other products or processes, in some examples the process may interact with other products or processes. Such interaction may be provided to enhance the flexibility or desirability of the process.

The systems and techniques presented herein detail a uniform and unified firmware in-field upgrade capability for the optics modules may ensure compatibility, security and code quality, and scalability. In some examples, an intermediate representation, which includes vendor firmware upgrade operations and control logic, may be defined, received, and parsed. Read/write operations may be communicated to optical module(s) based on the control logic. In some examples, a unified optics module firmware in-field upgrade framework, which has multiple defined software layers, may ensure a uniform and unified approach to managing optics module(s) from different vendors and used by different projects. The software layers that may properly translate optics module read/write operations, abstract and make uniform the read/write operations, provide libraries of intermediate representations, package the intermediate representations into executables/scripts, monitor optics module status, determine when a new firmware is released, and gradually upgrade the optics module firmware. The systems and techniques as presented herein may improve the performance and increase the efficiency of optics module upgrades, reduce latency and variability associated with such upgrades, and reduce the need to upkeep many tools and procedures for such upgrades thereby reducing the storage needed to perform such upgrades.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible examples. Further, the same reference numbers in different drawings can identify the same or similar elements.

Numerous examples are described in the present application, and are presented for illustrative purposes only. The described examples are not, and are not intended to be, limiting in any sense. One of ordinary skill in the art will recognize that the disclosed subject matter may be practiced with various modifications and alterations, such as structural, logical, software, and electrical modifications. It should be understood that the described features are not limited to usage in the one or more particular examples or drawings with reference to which they are described, unless expressly specified otherwise.

The foregoing discussion is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

The invention claimed is:

1. A method of upgrading firmware within an optics module, the method comprising:
   receiving, using one or more processors, an intermediate representation (IR) based file, wherein the IR based file includes operations and control logic for upgrading the optics module;
   parsing, using the processors, the IR based file to determine the operations;
   communicating, using the processors, the operations to the optics module based on the control logic; and
   upgrading, using the processors, the firmware of the optics module based on the communicated operations.

2. The method of claim 1, wherein the IR based file is a comma separated value (CSV) file.

3. The method of claim 1, wherein the operations comprise Two Wire Interface (TWI) protocol read and write operations.

4. The method of claim 1, wherein the IR based file comprises a plurality of sections, the plurality of sections including a first section having a supported optics module based firmware revision and a second section defining delays after the operations.

5. The method of claim 1, wherein the IR based file is received from an optics module vendor.

6. The method of claim 1, wherein the operations are communicated to the optics module using a management system that includes a management chip coupled to the optics module.

7. The method of claim 6, further comprising:
   decoding the operations from a first interface and protocol using the management chip; and sending the decoded operations to the optics module using a second interface and protocol.

8. A system for upgrading firmware within an optics module, the system comprising one or more processors configured to:
  receive an intermediate representation (IR) based file, wherein the IR based file includes operations and control logic for upgrading the optics module;
  parse the IR based file to determine the operations;
  communicate the operations to the optics module based on the control logic; and
  upgrade the firmware of the optics module based on the communicated operations.

9. The system of claim 8, wherein the IR based file is a comma separated value (CSV) file.

10. The system of claim 8, wherein the operations comprise Two Wire Interface (TWI) protocol read and write operations.

11. The system of claim 8, wherein the IR based file comprises a plurality of sections, the plurality of sections including a first section having a supported optics module based firmware revision and a second section defining delays after the operations.

12. The system of claim 8, wherein the IR based file is received from an optics module vendor.

13. The system of claim 8, wherein the operations are communicated to the optics modules using a management system that includes a management chip coupled between the optics module and a processor.

14. The system of claim 13, wherein the one or more processors are further configured to:
  decode the operations from a first interface and protocol using the management chip; and
  send the decoded operations to optics module using a second interface and protocol.

15. A non-transitory computer-readable medium storing instructions that, when executed by one or more processors, cause the one or more processors to:
  receive an intermediate representation (IR) based file, wherein the IR based file includes operations and control logic for upgrading an optics module;
  parse the IR based file to determine the operations;
  communicate the operations to the optics module based on the control logic; and
  upgrade the firmware of the optics module based on the communicated operations.

16. The non-transitory computer-readable medium of claim 15, wherein the IR based file is a comma separated value (CSV) file.

17. The non-transitory computer-readable medium of claim 15, wherein the operations comprise Two Wire Interface (TWI) protocol read and write operations.

18. The non-transitory computer-readable medium of claim 15, wherein the IR based file comprises a plurality of sections, the plurality of sections including a first section having a supported optics module based firmware revision and a second section defining delays after the operations.

19. The non-transitory computer-readable medium of claim 15, wherein the IR based file is received from an optics module vendor.

20. The non-transitory computer-readable medium of claim 15, wherein the operations are communicated to the optics module using a management system that includes a management chip coupled between the optics module and a processor.

* * * * *